United States Patent [19]

Morigami et al.

[11] 4,192,971
[45] Mar. 11, 1980

[54] REMOTE-CONTROLLABLE AUTOMATIC TELEPHONE ANSWERING DEVICE

[75] Inventors: Eiji Morigami, Yachiyo; Motoharu Inahara, Tokyo, both of Japan

[73] Assignee: Iwasaki Tsushinki Kabushiki Kaisha, Japan

[21] Appl. No.: 889,437

[22] Filed: Mar. 23, 1978

[30] Foreign Application Priority Data

Mar. 25, 1977 [JP] Japan .................................. 52-32064
Mar. 25, 1977 [JP] Japan .................................. 52-32065

[51] Int. Cl.$^2$ ...................... H04M 1/64; H04M 11/10
[52] U.S. Cl. ................................ 179/6 E; 360/74.4
[58] Field of Search ...................... 179/6 E; 360/74.4

[56] References Cited

U.S. PATENT DOCUMENTS

| | | | |
|---|---|---|---|
| 3,508,004 | 4/1970 | Waldman | 179/6 E |
| 3,843,842 | 10/1974 | Muller | 179/6 E |
| 3,978,289 | 8/1976 | Konno | 179/6 E |

Primary Examiner—Bernard Konick
Assistant Examiner—Alan Faber
Attorney, Agent, or Firm—Robert E. Burns; Emmanuel J. Lobato; Bruce L. Adams

[57] ABSTRACT

An automatic telephone answering device, which sends out the contents of at least one recorded message to a calling party of a remote place upon arrival of a remote control signal from the calling party after the detection of a ringing signal sent over a communication circuit. In response to a first-received one of the remote control signal, a low-frequency signal generated from a low-frequency oscillator is recorded in a second channel developed on the same recording tape as a first channel for recording message in a forward direction for a predetermined period of time. A recording tape rewinding mechanism of the device is controlled to rewind the recording tape after completion of the recording of the low-frequency signal so that magnetic heads of the first channel and the second channel are opposite a position on the recording tape beyond the recorded position of the low-frequency signal but short of the end of a last recorded message. If the remote control signal is still received when the recording tape reaches the above position, at least one of the recorded messages is reproduced. The above rewind control is again carried out when the low-frequency signal is reproduced during the reproducing operation of the recorded message.

6 Claims, 7 Drawing Figures

REMOTE-CONTROLLABLE AUTOMATIC TELEPHONE ANSWERING DEVICE

BACKGROUND OF THE INVENTION

1. Field of the Invention

This invention relates to a remote-controllable automatic telephone answering device.

2. Description of the Prior Art

It is well-known that the so-called remote-controllable automatic telephone answering device of the known type has a function for automatically responding to a ringing signal (16 Hz) sent from a calling party over a communication circuit to maintain the communication circuit in the communication loop state for sending out an answering message previously recorded on an answering message recording tape to the calling party, and a function for automatically recording a calling party's message on a calling party's message recording tape (hereinafter called as a message recording tape) and, in addition, a function for rewinding and reproducing the message recording tape in response to a specific remote control signal sent from a remote place over a communication circuit, thereby to enable listening to the calling party's message at the remote place.

There have been proposed various systems for receiving a remote control signal in such a device. In any of the conventional devices of this kind, there has been adopted a system which once sends out an answering message to the calling party to inform him of recording his message and then switches the device to the message recording state and receives a remote control signal in the message recording state.

In other words, the conventional remote-controlled automatic telephone answering devices employ a method which receives the remote control signal from the calling party in the abovesaid message recording state and records the remote control signal itself or a mark signal from an internal oscillator for a certain period of time and then rewinds the recording tape for a predetermined period of time or to the starting end of the tape.

In such a method, when an ordinary calling party other than the remote controller records his message, if malfunction occurs in the device due to the calling party's voices, ambient noise at the side of the calling party or circuit noise, the device is put in its remote-controlled state to rewind and reproduce the tape as mentioned above. In this case, there is a possibility that the recorded contents are overheard by other persons than the possessor of the device. Further, in a case where the calling party abandons the call for some reasons after sending out a remote control signal for a short time, the recording tape is automatically rewound, as described above, and the device continues to close and hold the communication loop circuit, so that the device cannot respond to a new call in this condition.

Besides, when the remote control signal is stopped, if a mark signal is recorded on the message recording tape and left unerased, the tape stops at the position of the mark signal during a reproducing operation, making it impossible to reproduce the subsequent recorded content.

For a remote-controlled automatic answering telephone device of the system which stably stores the recorded content even if a remote control operation takes place, there has heretofore been employed a method which, upon detection of a mark signal after completion of sending out a message, rewinds the recording tape for a predetermined period of time (about 0.3 to 0.5 sec.) and then drives the recording tape for steady-state running (about 15 to 20 sec.) to erase the mark signal, or a method which employs a mark signal detecting magnetic head at the preceding stage of an erase head for erasing the mark signal and which erases the mark signal by energizing the erase head after the detection of the mark signal. In either case, erasing of the mark signal leaves an erased part on the recording tape and the next calling party's message is recorded after the erased part, so that in a case of listening to the message by a remote control operation, an unnecessary silent part is reproduced and sent out, which gives the calling party not only a sense of uneasiness but also such an impression as if reproducing of the message is finished. Further, the abovesaid methods have the defects of prolonged time for remote listening and inefficient use of the tape.

SUMMARY OF THE INVENTION

An object of this invention is to provide an automatic telephone answering device in which, in a case of recording a mark signal in a channel on the same recording tape as a message recording channel in response to a remote control signal, even if the remote control signal is interrupted, the mark signal is essentially erased by the next recording operation to perform the next reproducing operation without any trouble.

Another object of this invention is to provide an automatic telephone answering device which, in the abovesaid case, ensures stable storage of the content of the message recorded on the message recording tape and prevention of unnecessary closing of the communication loop circuit.

On the basis of the fact that when an ordinary calling party abandons a call after recording his message, a central office signal such as a lock out tone is recorded for a certain period of time (about 15 to 20 sec.) another object of this invention is to provide an automatic telephone answering device which is adapted so that, after detection of the mark signal, the recording tape is rewound to the central office signal recorded position to put the device in the waiting state and the mark signal is erased by the next message recording.

To overcome the defects mentioned above, when receiving a remote control signal, the device of this invention is first enabled in the remote-controlled state and then, in order to record the position of reception of the signal, the device is put in the recording state for a certain period of time (about 1 sec.) by a first timer operating when the device is put in the remote-controlled state, and then a position recording signal (hereinafter referred to as the mark signal) is recorded on the tape by the low-frequency output from an internal low-frequency oscillator which similarly starts the operation when the device is put in the remote-controlled state. After recording the mark signal, the tape is rewound for a very short period of time (about 0.3 sec.) by a second timer, which operates upon completion of recording of the mark signal, so that the magnetic heads of the device are opposite a position on the tape beyond the recorded mark signal but short of the end of a last recorded message.

During such operations, that is, in the period from the time when the device is put in the remote-controlled state to the time of completion of the slight tape rewinding under control of the second timer, the reception of the remote control signal is inhibited. Moreover, at the time of completion of the slight tape rewinding under control of the second timer, the reception of the remote control signal is enabled again and, at this time, if the remote control signal is still received, the tape rewinding is continued so long as the remote control signal is sent out from the calling party.

BRIEF DESCRIPTION OF THE DRAWINGS

The principle, construction and operation of this invention will be clearly understood from the following detailed description taken in conjunction with the accompanying drawings, in which.

DESCRIPTION OF THE PREFERRED EMBODIMENTS

Figure 1:
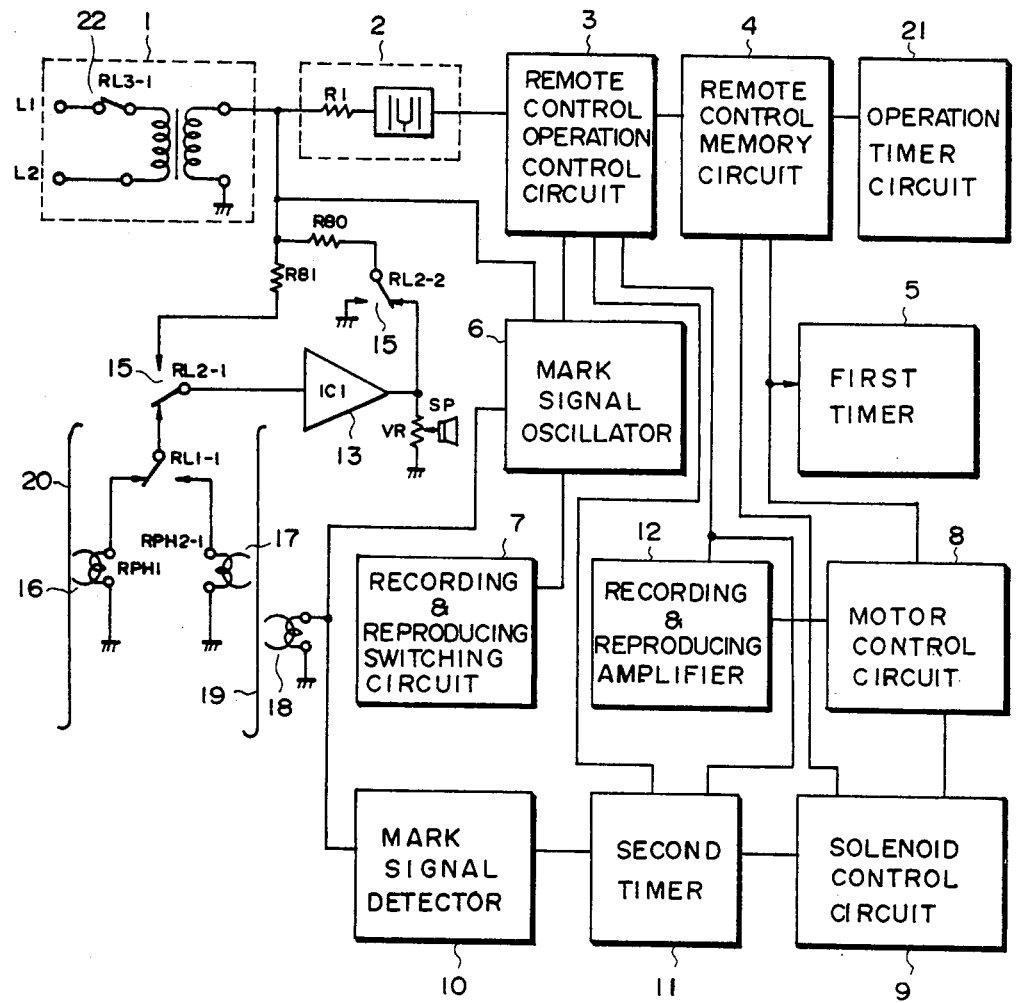
FIG. 1 is a block diagram including circuit connections illustrating an embodiment of this invention.

With reference to FIG. 1 showing an embodiment of this invention, reference numeral 1 indicates a line transformer; 2 designates a remote control signal selector; 3 identifies a remote-control-operation control circuit; 4 denotes a remote control memory circuit; 5 represents a first timer; 6 shows a mark signal oscillator for generating a mark signal; 7 refers to a recording and reproducing switching circuit; 8 indicates a motor control circuit; 9 designates a solenoid control circuit; 10 identifies a mark signal detector; 11 denotes a second timer; 12 designates a recording and reproducing amplifier; 13 represents a recording and reproducing amplifier; 14 shows a contact of a remote control relay in the memory 4; 15 refers to a contact of a recording and reproducing switching relay in the circuit 7; 16 indicates an answering message recording and reproducing head; 17 designates a first head for recording and reproducing a calling party's message; 18 identifies a second head for recording and reproducing the mark signal; 19 denotes a calling party's message recording tape (i.e. a message recording tape); 20 represents an answering message recording tape; 21 shows an operation timer circuit; 22 refers to a contact of a communication circuit loop relay; $RL_1$ indicates a remote control relay; $RL_2$ designates a recording and reproducing switching relay; and $RL_3$ identifies a communication circuit loop relay.

Figure 2:
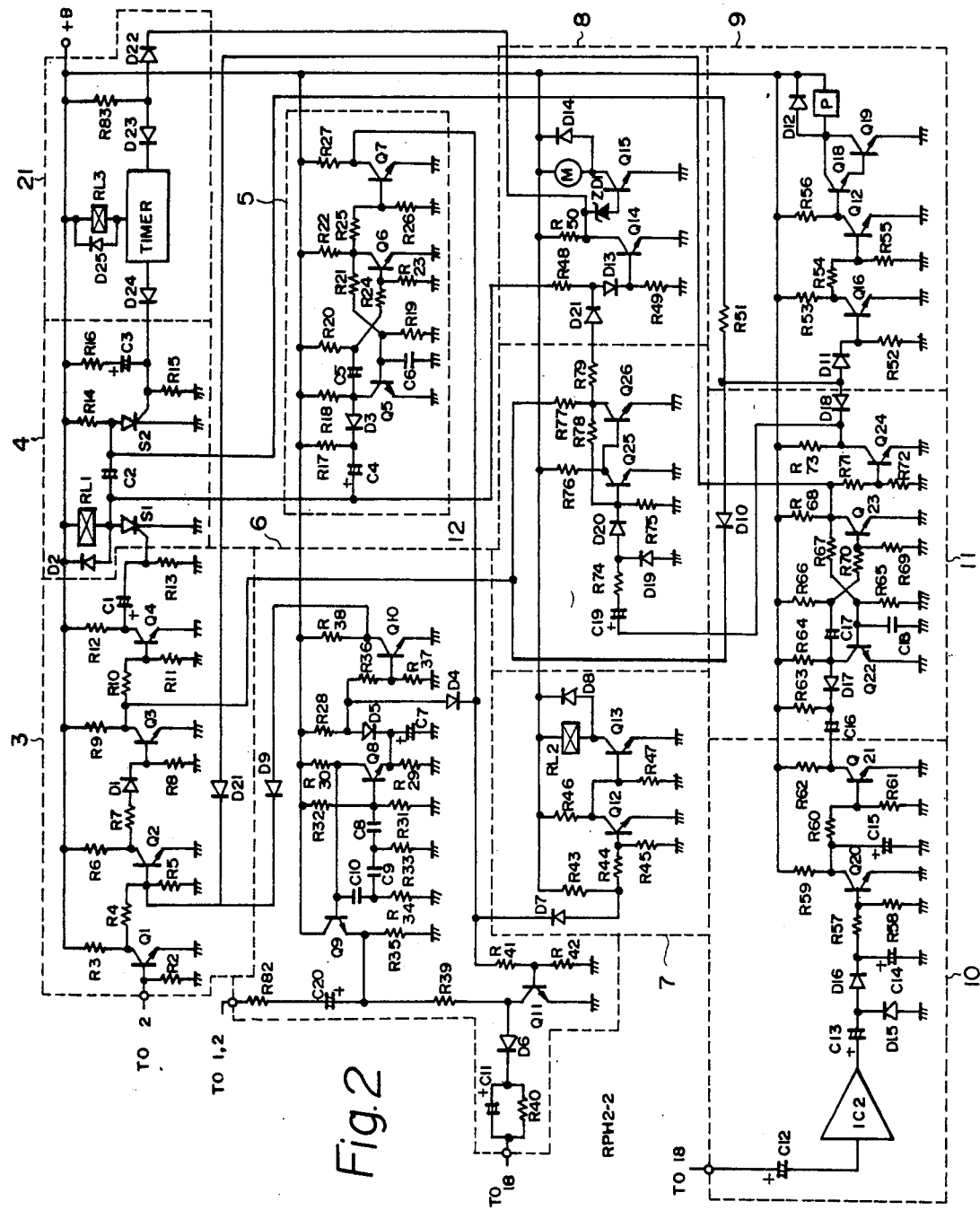
FIG. 2 is a circuit diagram illustrating examples of block circuits employed in the embodiment shown in FIG. 1.

Blocks in FIG. 1 are shown in FIG. 2 in detail.

The following will describe the operation of the preferred embodiment. At first, the message recording tape 19 is in the state shown in FIG. 3(*a*), in which a message 30 and a lock-out tone 31 have been just recorded in a first channel $TR_1$. When a call reaches the automatic telephone answering device from a calling party, an operation timer 21a in the operation timer circuit 21 is charged by a terminating circuit, not shown, to start the device to send out an answering message to the calling party. In this instance, if a remote control signal is sent out from the calling party, it is frequency-selected and received by the remote control signal selector 2, by which transistors $Q_1$, $Q_2$, $Q_3$ and $Q_4$ of the remote-control-operation control circuit 3 are turned ON, OFF, ON and OFF, respectively. Upon turning OFF of the transistor $Q_4$, thyristors $S_1$ and $S_2$ of the remote control memory circuit 4 are turned ON and OFF, respectively, via a capacitor $C_1$. When the device is energized, the thyristor $S_2$ is driven by a resistor $R_{16}$ and a capacitor $C_3$. The thyristors $S_1$ and $S_2$ remain stable in their ON and OFF states, respectively. By turning ON of the thyristor $S_1$, a base current supplied from its anode via a resistor $R_{48}$ and a diode $D_{13}$ of the motor control circuit 8 is terminated, so that a transistor $Q_{14}$ is turned OFF while a transistor $Q_{15}$ is turned ON, energizing a motor M for the calling party's use. By turning OFF of the thyristor $S_2$ of the remote control memory circuit 4, a base current is supplied from its anode via a resistor $R_{51}$ and a diode $D_{11}$ of the solenoid control circuit 9, turning ON a transistor $Q_{16}$, OFF a transistor $Q_{17}$, ON a transistor $Q_{18}$ and OFF a transistor $Q_{19}$ to attract a solenoid for the calling party's message use. As a result of this, the tape 19 starts running in the steady-state.

Figure 3:
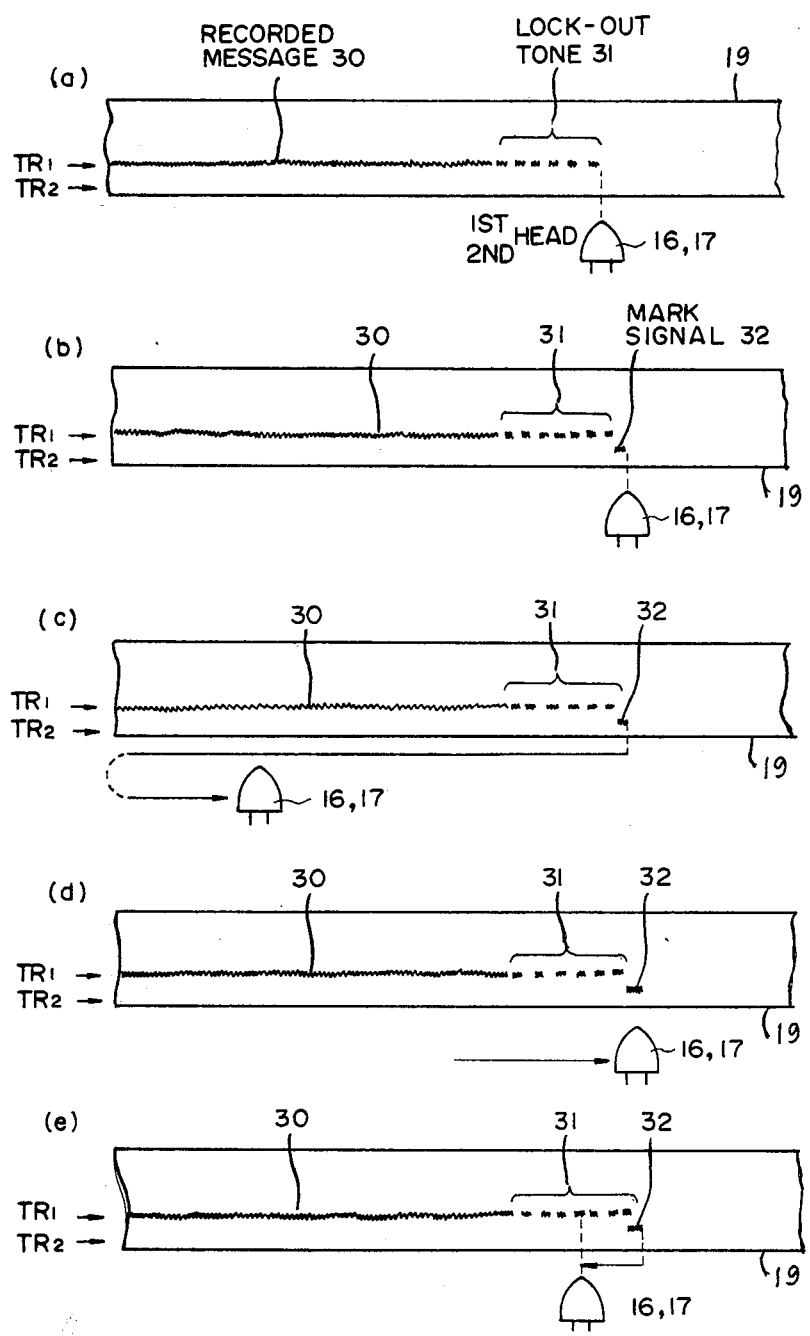
FIG. 3, consisting of *a–e*, shows diagrams explanatory of the operation of the embodiment shown in FIGS. 1 and 2.

Further, the transition of the thyristor $S_1$ of the remote control memory circuit 4 from the OFF state to the ON state is differentiated by a capacitor $C_4$ and a resistor $R_{17}$ of the first timer 5 to drive via a diode $D_3$ a monostable multivibrator composed of transistors $Q_5$ and $Q_6$. The transistors $Q_5$ and $Q_6$ are turned ON and OFF, respectively, to turn ON a transistor $Q_7$ for a time constant (about 1 sec.) substantially determined by a resistor $R_{20}$ and a capacitor $C_5$. Upon turning ON of the transistor $Q_7$, a reverse bias applied to the emitter of a transistor $Q_8$ in the oscillator 6 through a resistor $R_{28}$ and a diode $D_5$ is cut-off by a diode $D_4$ to actuate the transistor $Q_8$ for oscillation. The oscillation output is applied via a capacitor $C_{20}$ and a resistor $R_{82}$ from the emitter of a transistor $Q_9$ to the line transformer 1 and sent out therefrom to the calling party. At the same time, since a transistor $Q_{11}$ of the oscillator 6 is held in the OFF state by turning ON of the transistor $Q_7$ in the first timer 5, the oscillation output is recorded by the second head 18 on the message recording tape 19 via a resistor $R_{39}$, a diode $D_6$, the resistor $R_{40}$ and a capacitor $C_{11}$. This is a recording operation of a mark signal 32. Further, at the same time, this recorded signal is amplified by an amplifier $1C_2$ in the mark signal detector 10 and rectified by diodes $D_{15}$ and $D_{16}$ to turn ON a transistor $Q_{20}$ and OFF a transistor $Q_{21}$. When the transistor $Q_7$ of the first timer 5 changes from the ON state to the OFF state as described above, the oscillator 6 stops its operation so that recording on the message recording tape 19 by the second head 18 is also stopped, and at the same time the input to the mark signal detector 10 is cut off to turn OFF the transistor $Q_{20}$ and turn ON the transistor $Q_{21}$. The described sequence of operations results in the recorded state of the mark signal 32 as shown in FIG. 3(*b*).

The transition of the transistor $Q_{21}$ from the OFF state to the ON state is differentiated by a capacitor $C_{16}$ and a resistor $R_{63}$ of the second timer 11 to drive a monostable multivibrator composed of transistors $Q_{22}$ and $Q_{23}$ to turn ON the transistor $Q_{22}$ and turn OFF the transistor $Q_{23}$. This is effective to turn ON a transistor $Q_{24}$ for a time constant (about 0.3 to 0.5 sec.) substantially determined by a resistor $R_{66}$ and a capacitor $C_{17}$. Upon turning ON of the transistor $Q_{24}$, a base current of a transistor $Q_{16}$ supplied through a resistor $R_{51}$ in the solenoid control circuit 9 is cut off via a diode $D_{18}$ to turn OFF the transistor $Q_{16}$, to turn ON the transistor $Q_{17}$, to turn OFF the transistor $Q_{18}$ and to turn ON the transistor $Q_{19}$, so that the solenoid P is restored to actuate only the motor M and the message recording tape 19 is rewound by a tape rewinding mechanism for a period of time determined by the resistor $R_{66}$ and the capacitor $C_{17}$ mentioned above.

The transition of the transistor $Q_{24}$ of the second timer 11 from the ON state to the OFF state turns ON a transistor $Q_{25}$ and turns OFF a transistor $Q_{26}$ via capacitor $C_{19}$ in the recording and reproducing amplifier 12. The collector of the transistor $Q_{26}$ is connected via a resistor $R_{77}$ to the collector of the transistor $Q_3$ of the remote-control-operation control circuit 3. Since the transistor $Q_3$ remains in the ON state as long as the remote control signal is received, the collector of the transistor $Q_{26}$ of the recording and reproducing amplifier 12 has a low potential to maintain the transistors $Q_{14}$ and $Q_{15}$ of the motor control circuit 8 in the ON state and the OFF state, respectively, and the motor M for the calling party's message use continues its operation to keep on rewinding the tape 19 until the remote control signal from the calling party is cut off. Upon cutting off of the signal from the calling party, the transistor $Q_3$ of the remote-control-operation control circuit 3 is turned OFF as described above, so that the transistor $Q_{16}$ of the solenoid control circuit 9 is turned ON by the conduction of its base circuit due to turning OFF of the diode $D_{10}$ while the transistors $Q_{17}$, $Q_{18}$ and $Q_{19}$ are turned OFF, ON and ON, respectively. As a result, the solenoid P for the calling party's message use is attracted again to cause the tape 19 to start the steady-state running and the content of the message 30 is reproduced by the first head 17 and sent out to the calling party (see FIG. 3(c)).

When the mark signal 32 is detected by the second head 18 for carrying out the reproducing operation, the monostable multivibrator of the second timer 11 is driven by the mark signal detector 10 as described above to turn ON the transistor $Q_{24}$ for about 0.3 to 0.5 sec. as mentioned previously. Upon turning ON of the transistor $Q_{24}$, the base current of the transistor $Q_{16}$ of the solenoid control circuit 9 is cut off by the diode $D_{18}$ to turn OFF the transistor $Q_{16}$ while the transistors $Q_{17}$, $Q_{18}$ and $Q_{19}$ are turned ON, OFF and OFF, respectively. Thus, the solenoid P for the calling party's message is restored and, as described above, the message recording tape 19 is rewound during an interval where the transistor $Q_{24}$ of the second timer 11 assumes the ON state. When the transistor $Q_{24}$ changes from the ON state to the OFF state, this transition causes the transistors $Q_{25}$ and $Q_{26}$ to turn ON and OFF, respectively, via the capacitor $C_{19}$ of the recording and reproducing amplifier 12. The collector of the transistor $Q_{26}$ is connected via the resistor $R_{77}$ to the collector of the transistor $Q_3$ of the remote-control-operation control circuit 3 but since no remote control signal is received, the transistor $Q_3$ is turned OFF and the potential of the collector of the transistor $Q_{26}$ becomes high to turn ON and OFF the transistors $Q_{14}$ and $Q_{15}$ of the motor control circuit 8, respectively, stopping the motor M for the calling party's message to stop running of the tape 19 (see FIG. 3(d)).

Similarly, by turning OFF the transistor $Q_{24}$ of the second timer 11 from the ON state, the transistors $Q_{16}$, $Q_{17}$, $Q_{18}$ and $Q_{19}$ of the solenoid control circuit 9 are turned ON, OFF, ON and ON, respectively, to again attract the solenoid P for the calling party's message. If a remote control signal is not sent out from the calling party again in the above state, the transistor $Q_{14}$ of the motor control circuit 8 is turned ON to render diode $D_{22}$ conductive, and the operation timer 21a, whose charging loop is thereby cut off, starts discharging and after a certain period of time (about 15 sec.) the relay $RL_3$ is turned OFF to open the communication loop circuit by a contact 23 and to drive the thyristor $S_2$ of the remote control memory circuit 4, turning OFF the thyristor $S_1$ and turning ON the thyristor $S_2$ (its initial state). Thus, the device is restored to the waiting state where the magnetic heads 16, 17 are opposite a position on the tape 19 beyond the recorded mark signal 32 but short of the end of a last recorded message 30, as shown in FIG. 3(e).

As described above, in the present invention, when a remote control signal is received, the mark signal is recorded and while the tape is rewound by a little length corresponding to the length of the recorded signal, reception of the abovesaid signal is inhibited and thereafter reception of the signal is permitted again and, at this time, if the signal is not transmitted from the calling party, the communication loop circuit is opened. With the arrangement that the message recording tape is rewound in a case of receiving the abovesaid signal from the calling party, it is possible to prevent the content recorded on the message recording tape from being unnecessarily sent out to other calling parties than a remote controller as a result of the aforementioned erroneous operation to maintain perfect preservation of the record content. And even if the calling party abandons a call immediately after the remote control operation, the communication loop circuit is not unnecessarily closed and held, permitting the device to rapidly respond to a next call.

In the above embodiment, after recording the mark signal in response to a remote control signal, the recording tape is rewound to a detecting position beyond the mark signal but short of the end of a last recorded message and when it is detected that the remote control signal continues, the tape is further rewound. However, it is possible to omit the operation of reconfirming the remote control signal at this detecting position and to start rewinding of the tape for reproducing immediately after recording of the mark signal.

Further, if a plunger is associated with a stopping mechanism for the motor M, it is possible to stop the tape accurately at the abovesaid predetermined position.

As described above, according to this invention, since erasing of the mark signal does not leave any non-recorded portion on the message tape, there is no likelihood of giving the calling party a sense of uneasiness and the tape can be used efficiently.

What we claim is:

1. In an automatic telephone answering device which sends out the contents of at least one recorded message to a calling party at a remote place upon arrival of a remote control signal from said calling party after the detection of a ringing signal sent over a communication circuit, the improvement comprising: an oscillator for generating a low-frequency signal; means responsive to a first-received remote control signal to record the low-frequency signal, in a second channel developed on the same recording tape as a first channel for recording messages, in a forward direction for a predetermined period of time; a plurality of magnetic heads respectively corresponding to said first and second channels on said recording tape; a recording tape rewinding mechanism; and control means for controlling said recording tape rewinding mechanism of said device after completion of the recording of the low-frequency signal to rewind the recording tape so that said magnetic heads corresponding to said first channel and said second channel are opposite a position on said recording tape beyond the recorded position of said low-frequency signal but short of the end of a last recorded message.

2. An automatic telephone answering device according to claim 1, including means for permitting the first remote control signal to be received during sending out of an answering message after said detection of the ringing signal.

3. In an automatic telephone answering device which sends out the contents of at least one recorded message to a calling party at a remote place upon arrival of a remote control signal from said calling party after the detection of a ringing signal sent over a communication circuit, the improvement comprising: an oscillator for generating a low-frequency signal; means responsive to a first-received remote control signal to record the low-frequency signal, in a second channel developed on the same recording tape as a first channel for recording messages, in a forward direction for a predetermined period of time; a plurality of magnetic heads respectively corresponding to said first and second channels on said recording tape; a recording tape rewinding mechanism; first control means for controlling said recording tape rewind mechanism of the device after completion of the recording of the low-frequency signal to rewind the recording tape so that said magnetic heads corresponding to said first channel and said second channel are opposite a position on said recording tape beyond the recorded low-frequency signal but short of the end of a last recorded message; second control means for controlling the recording tape rewind mechanism to continue the tape rewinding operation for further rewinding the tape for sending out a message previously recorded in response to reception of the remote control signal when the recording tape has reached the abovesaid position, and third control means for controlling the recording tape rewind mechanism to rewind the recording tape to the position short of the end of the last recorded message when the low-frequency signal is reproduced from the second channel during reproducing of the message.

4. An automatic telephone answering device according to claim 3, including means for permitting the first remote control signal to be received during sending out of an answering message after said detection of the ringing signal.

5. In an automatic telephone answering device which sends out the content of at least one recorded message to a calling party at a remote place upon arrival of a remote control signal after the detection of a ringing signal sent over a communication circuit, the improvement comprising: an oscillator for generating a low-frequency signal; means responsive to a first-received remote control signal to record the low-frequency signal, in a second channel developed on the same recording tape as a first channel for recording messages, in a forward direction for a predetermined period of time; a plurality of magnetic heads respectively corresponding to said first and second channels on said recording tape; a recording tape rewinding mechanism; message reproducing means for controlling said recording tape rewind mechanism after completion of the recording of the low-frequency signal to rewind the recording tape for reproducing the content of the recorded message; and control means for controlling the recording tape rewind mechanism to rewind the recording tape so that said magnetic heads corresponding to said first channel and said second channel are opposite a halt position on said recording tape beyond the recorded low-frequency signal but short of the end of the recorded message when the low-frequency signal is reproduced from the second channel during said reproducing.

6. An automatic telephone answering device according to claim 5, wherein said control means includes a plunger for stopping the recording tape at the halt position.

* * * * *